(12) United States Patent
Lim et al.

(10) Patent No.: US 11,941,886 B2
(45) Date of Patent: Mar. 26, 2024

(54) OBJECT DETECTION METHOD AND CAMERA APPARATUS

(71) Applicant: PixArt Imaging Inc., Hsin-Chu (TW)

(72) Inventors: Kevin Len-Li Lim, Penang (MY); Joon Chok Lee, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 310 days.

(21) Appl. No.: 17/385,957

(22) Filed: Jul. 27, 2021

(65) Prior Publication Data
US 2023/0030415 A1  Feb. 2, 2023

(51) Int. Cl.
*G06V 10/50* (2022.01)
*G06V 10/60* (2022.01)
*G06V 10/75* (2022.01)
*G06V 20/52* (2022.01)

(52) U.S. Cl.
CPC ............ *G06V 20/52* (2022.01); *G06V 10/50* (2022.01); *G06V 10/60* (2022.01); *G06V 10/758* (2022.01)

(58) Field of Classification Search
CPC ........ G06V 20/52; G06V 10/60; G06V 10/50; G06V 10/758; G06V 10/25
See application file for complete search history.

(56) References Cited

U.S. PATENT DOCUMENTS

| | | | |
|---|---|---|---|
| 2013/0271601 A1* | 10/2013 | Rodriguez | G06T 7/194 348/143 |
| 2016/0004923 A1* | 1/2016 | Piekniewski | G06V 20/00 348/302 |
| 2016/0080625 A1* | 3/2016 | Itoh | H04N 23/74 348/234 |
| 2019/0313035 A1* | 10/2019 | Ito | G01J 1/42 |

* cited by examiner

*Primary Examiner* — Syed Haider
(74) *Attorney, Agent, or Firm* — Winston Hsu

(57) ABSTRACT

An object detection method of effectively increasing identification accuracy is applied to a camera apparatus and includes acquiring a reference image and a second reference image containing a specific surveillance area respectively via a first exposure parameter and a second exposure parameter greater than the first exposure parameter, utilizing the first exposure parameter and the second exposure parameter to respectively capture a first detection image and a second detection image during an object detection period, computing a first pixel value variation between the first reference image and the first detection image and a second pixel value variation between the second reference image and the second detection image, and comparing the first pixel value variation with the second pixel value variation to determine whether a target object is within the specific surveillance area.

19 Claims, 7 Drawing Sheets

I1r

I2r

I1d

I2d

OBJECT DETECTION METHOD AND CAMERA APPARATUS

BACKGROUND OF THE INVENTION

1. Field of the Invention

The present invention relates to an object detection method and a camera apparatus, and more particularly, to an object detection method of effectively increasing identification accuracy and a related camera apparatus.

2. Description of the Prior Art

A conventional surveillance camera utilizes one exposure parameter to capture the reference image and the detection image. The reference image is captured when a target object is not in the surveillance area of the surveillance camera. The detection image is captured in an operation period of the surveillance camera, and analyzed to determine whether the target object is moved into the surveillance area. The conventional surveillance camera computes pixel value difference between the reference image and the detection image. If the pixel value difference is smaller than or equal to a specific threshold, the surveillance area does not have obvious pixel variation, which means the target object is not existed; if the pixel value difference is greater than the specific threshold, the surveillance area has the obvious pixel variation, and the target object is interpreted as moving into the surveillance area. However, if the surveillance area has low illumination, the target object is difficult to identify in the detection image, and the conventional surveillance camera cannot distinguish the target object from the dark background within the detection image. Thus, design of a surveillance camera capable of accurately identifying the target object in the dark background is an important issue in the related surveillance industry.

SUMMARY OF THE INVENTION

The present invention provides an object detection method of effectively increasing identification accuracy and a related camera apparatus for solving above drawbacks.

According to the claimed invention, an object detection method of effectively increasing identification accuracy includes acquiring a reference image and a second reference image containing a specific surveillance area respectively via a first exposure parameter and a second exposure parameter greater than the first exposure parameter, utilizing the first exposure parameter and the second exposure parameter to respectively capture a first detection image and a second detection image during an object detection period, computing a first pixel value variation between the first reference image and the first detection image and a second pixel value variation between the second reference image and the second detection image, and comparing the first pixel value variation with the second pixel value variation to determine whether a target object is within the specific surveillance area.

According to the claimed invention, the object detection method further includes setting a region of interest inside the first reference image and the first detection image for computing the first pixel value variation within the region of interest.

According to the claimed invention, the object detection method further includes deciding whether to capture another reference image and another detection image by the second exposure parameter when the target object determined by the first pixel value variation conforms to the target object determined by the second pixel value variation.

According to the claimed invention, the object detection method further includes setting a first region whereinside the target object is located and a second region out of the first region in the first pixel value variation, comparing a difference between the first region and the second region with a gradient threshold, and deciding whether to capture another reference image and another detection image by the second exposure parameter according to a comparison result.

According to the claimed invention, the object detection method further includes actuating an optical detector to acquire ambient light information, and analyzing the ambient light information to decide whether to capture the second reference image and the second detection image by the second exposure parameter.

According to the claimed invention, the object detection method further includes acquiring the second exposure parameter via analysis of an intensity of the ambient light information.

According to the claimed invention, the object detection method further includes comparing a computed intensity value of the first reference image with an intensity threshold, and utilizing the second exposure parameter to capture the second reference image and the second detection image when the computed intensity value is smaller than the intensity threshold.

According to the claimed invention, the object detection method further includes acquiring at least one computed value of an average intensity value and a maximum intensity value of the first reference image, and transforming the computed value via a predefined weighting to compute the second exposure parameter.

According to the claimed invention, the object detection method further includes acquiring an intensity distribution histogram of the first reference image, dividing the intensity distribution histogram at least into a high intensity distribution region and a low intensity distribution region, and utilizing a ratio of the high intensity distribution region to the low intensity distribution region to compute the second exposure parameter.

According to the claimed invention, the object detection method further includes analyzing the second pixel value variation to decide whether to adjust the second exposure parameter.

According to the claimed invention, a camera apparatus of effectively increasing identification accuracy includes an image receiver and an operation processor. The image receiver is adapted to acquire a first reference image and a second reference image containing a specific surveillance area respectively via a first exposure parameter and a second exposure parameter greater than the first exposure parameter, and further utilize the first exposure parameter and the second exposure parameter to respectively capture a first detection image and a second detection image during an object detection period. The operation processor is electrically connected to the image receiver, and adapted to compute a first pixel value variation between the first reference image and the first detection image and a second pixel value variation between the second reference image and the second detection image, and further compare the first pixel value variation with the second pixel value variation to determine whether a target object is within the specific surveillance area.

The camera apparatus and the object detection method of the present invention can both utilize the short exposure image (such as the first reference image and the first detection image captured by the first exposure parameter) and the long exposure image (such as the second reference image and the second detection image captured by the second exposure parameter) to determine the existence of the target object. Analysis of the short exposure image may be insufficient to accurately detect the low-contrast target object under the low environmental illumination, and analysis of the long exposure image may be difficult to identify a bright feature of the target object which results in a supersaturated part of the image; therefore, the present invention can synchronously analyze the short exposure image and the long exposure image to execute the object detection method, and further provide the automatic turning-on/turning-off multi-exposure function, so that the camera apparatus can have advantages of the high identification accuracy and the preferred energy economy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
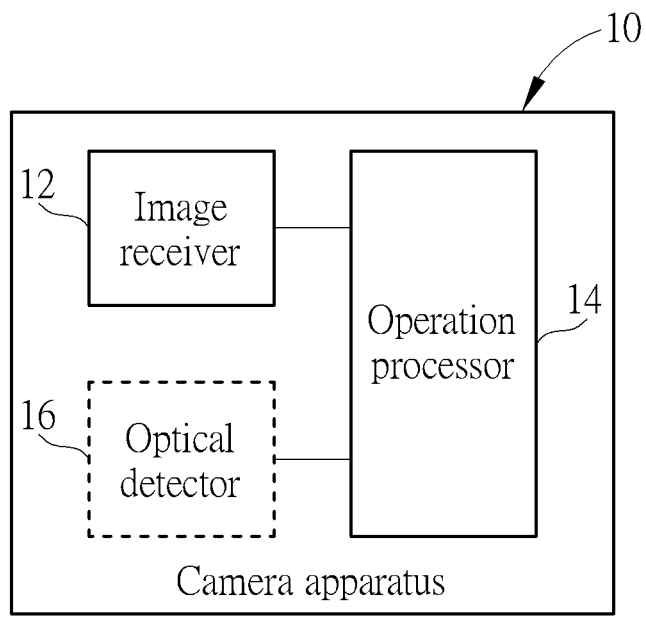
FIG. 1 is a functional block diagram of a camera apparatus according to an embodiment of the present invention.
Figure 2:
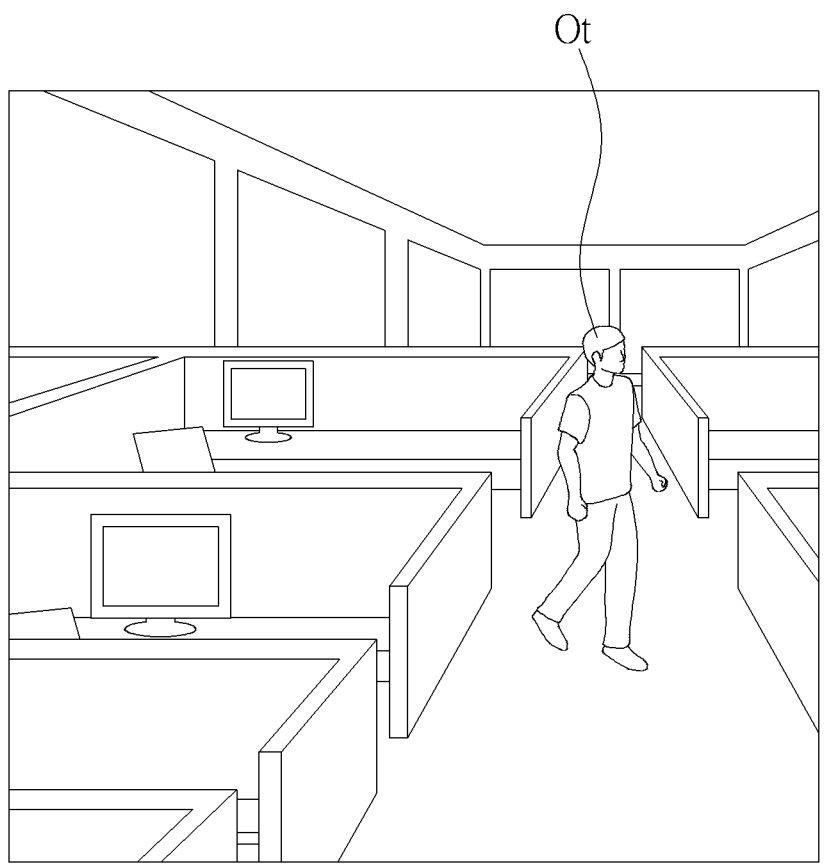
FIG. 2 is a diagram of a surveillance area of the camera apparatus according to the embodiment of the present invention.

Please refer to FIG. 1 and FIG. 2. FIG. 1 is a functional block diagram of a camera apparatus 10 according to an embodiment of the present invention. FIG. 2 is a diagram of a surveillance area of the camera apparatus 10 according to the embodiment of the present invention. The camera apparatus 10 can include an image receiver 12 and an operation processor 14 electrically connected to each other. The image receiver 12 can acquire a reference image and a detection image relevant to the surveillance area of the camera apparatus 10. The image receiver 12 may have an image capturing function, or can be electrically connected to a camera and acquire an image captured by the camera. The operation processor 14 can be communicated with the image receiver 12 in a wireless manner or in a wire manner for analysis of the reference image and the detection image. The operation processor 14 may be an operation unit independent of the image receiver 12, or be a built-in operation module of the image receiver 12.

Generally, the camera apparatus 10 can be suitable for indoor space or outdoor space. If the surveillance area has obvious intensity variation, the camera apparatus 10 can utilize several exposure parameters with different values to respectively acquire the reference image and the detection image of the same field of view, and then analyze pixel value variation between the reference image and the detection image acquired by different exposure parameters, for determining whether a target object Ot is existed in the surveillance area. The foresaid exposure parameters may include at least one normal exposure parameter and at least one over-exposed exposure parameter. The over-exposed exposure parameter can be used to capture the over-exposed reference image and the over-exposed detection image, so as to increase identification accuracy of the low-contrast target object Ot inside the surveillance area. The low-contrast target object Ot may be interpreted as a dark object stayed inside the dark background, which depends on an actual application. The exposure parameters with different values can be automatically set by the camera apparatus 10, or can be adjusted in accordance with environmental illumination variation of the surveillance area, or can be adjusted in accordance with an image feature of the reference image or the detection image.

As shown in FIG. 2, the camera apparatus 10 can be installed inside an office. The office may have a hallway stretched from a distant area to the camera apparatus 10. if illumination lamps of the office are not all turned on and the target object Ot (such as the passerby) walks from the distant area to the camera apparatus 10, the dusky office belongs to the foresaid dark background, and the target object Ot belongs to the foresaid dark object. When the camera apparatus 10 analyzes the reference image and the detection image captured by one exposure parameter, the target object Ot is difficult to clearly identify via the images captured by the normal exposure parameter; in the meantime, the camera apparatus 10 can automatically or manually actuate a multi-exposure function for accurately identifying whether the target object Ot is existed in the surveillance area.

Therefore, the camera apparatus 10 can optionally include an optical detector 16 electrically connected to the operation processor 14. The camera apparatus 10 can utilize the optical detector 16 to acquire ambient light information of the surveillance area, and then decide how to set a difference between the normal exposure parameter and the over-exposed exposure parameter. If the camera apparatus 10 has no optical detector, or has the turned-off optical detector 16, the pixel intensity of the specific image (which may be the first-acquired reference image) can be analyzed to decide the difference between the normal exposure parameter and the over-exposed exposure parameter. The present invention can automatically or manually actuate the multi-exposure function of the camera apparatus 10, and analyze the pixel value variation between the reference images and the detection images acquired by different exposure parameters, so as to accurately and effectively increase the identification accuracy of the target object Ot without being influenced by the environmental illumination variation.

It should be mentioned that the multi-exposure function of the present invention can utilize two or more than two different exposure parameters to respectively capture the reference image and the detection image. The following illustration discloses the embodiment utilizing two different exposure parameters to capture images, and does not further introduce other possible embodiments that utilize three or more exposure parameters to detect the target object Ot. Besides, the exposure parameter can be set and adjusted via an exposure time, a shutter speed, an aperture value and/or a circuit gain of the camera apparatus 10, which depends on a design demand.

Figure 3:
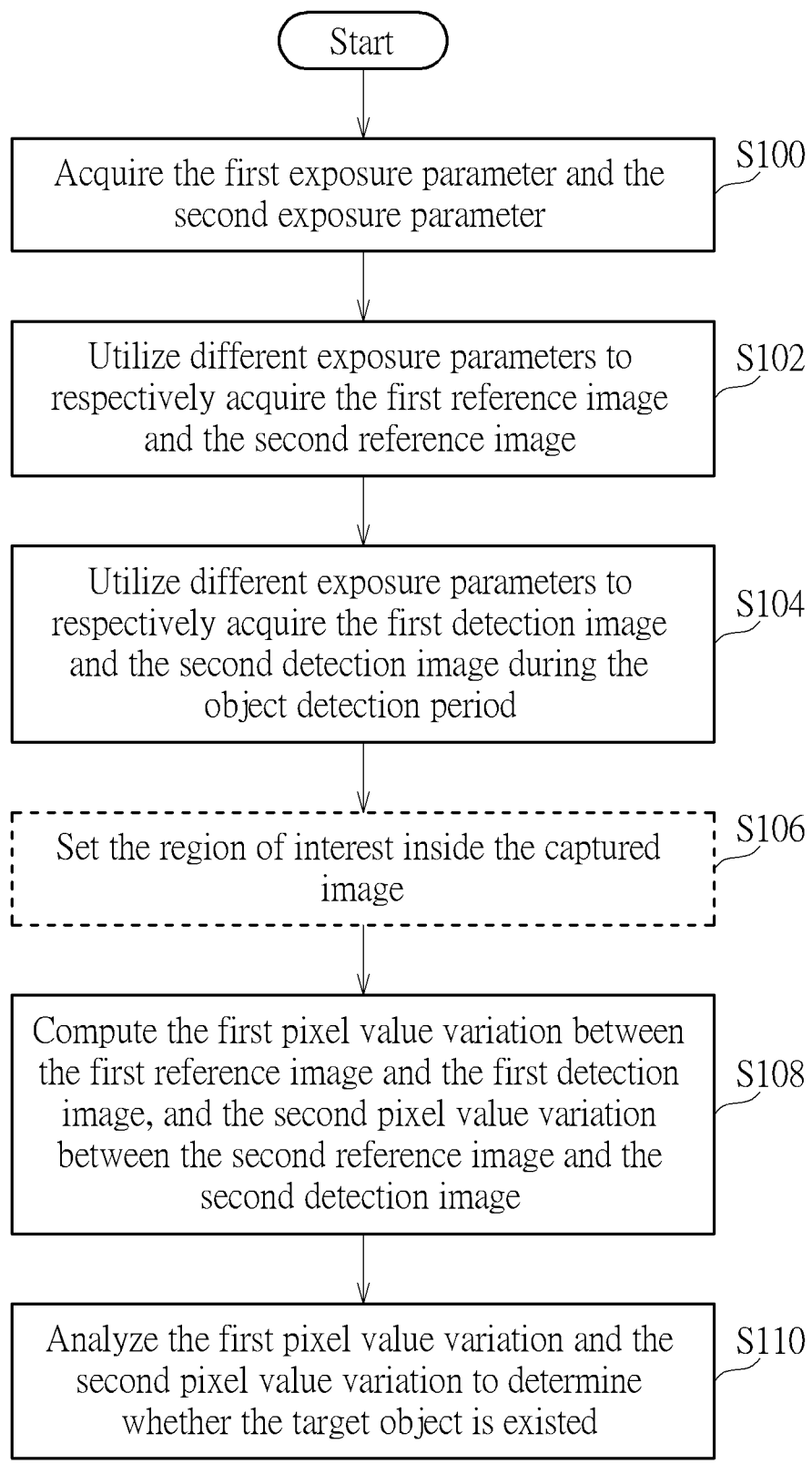
FIG. 3 is a flow chart of an object detection method according to the embodiment of the present invention.
Figure 4:
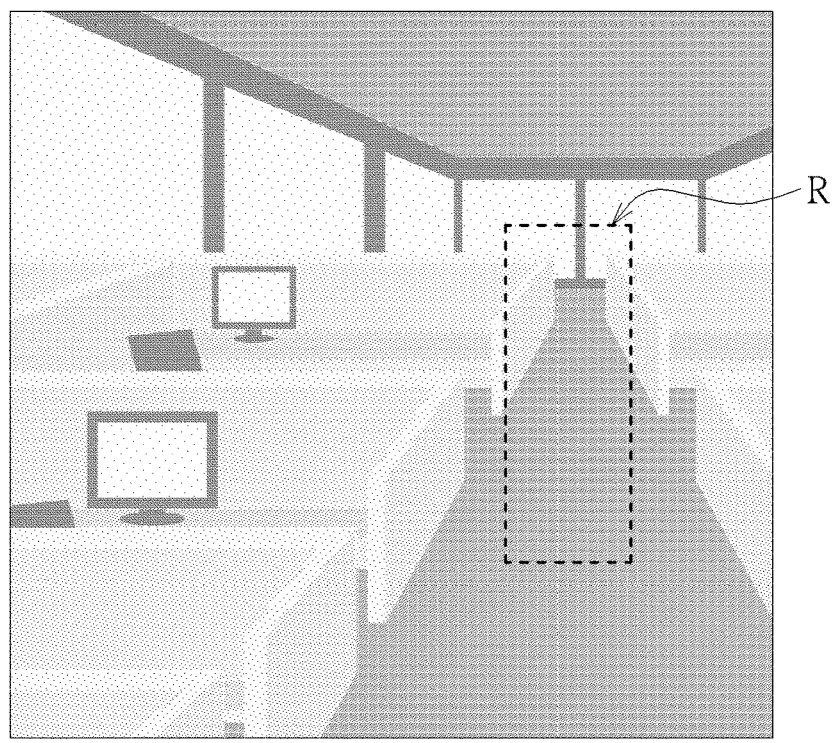
FIG. 4 to FIG. 7 are diagrams of images captured by the camera apparatus in different conditions according to the embodiment of the present invention.
Figure 5:
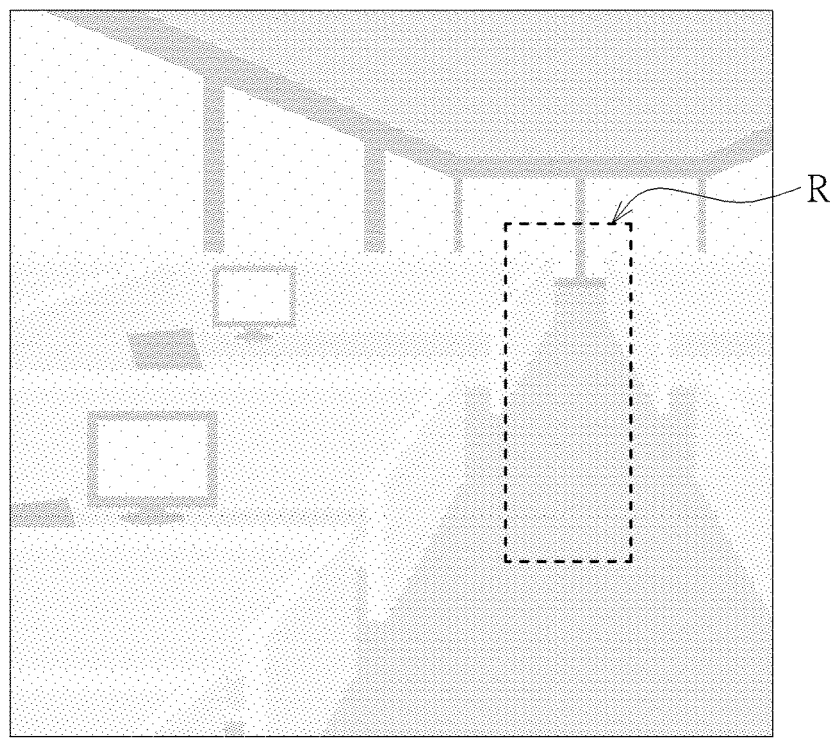
Figure 6:
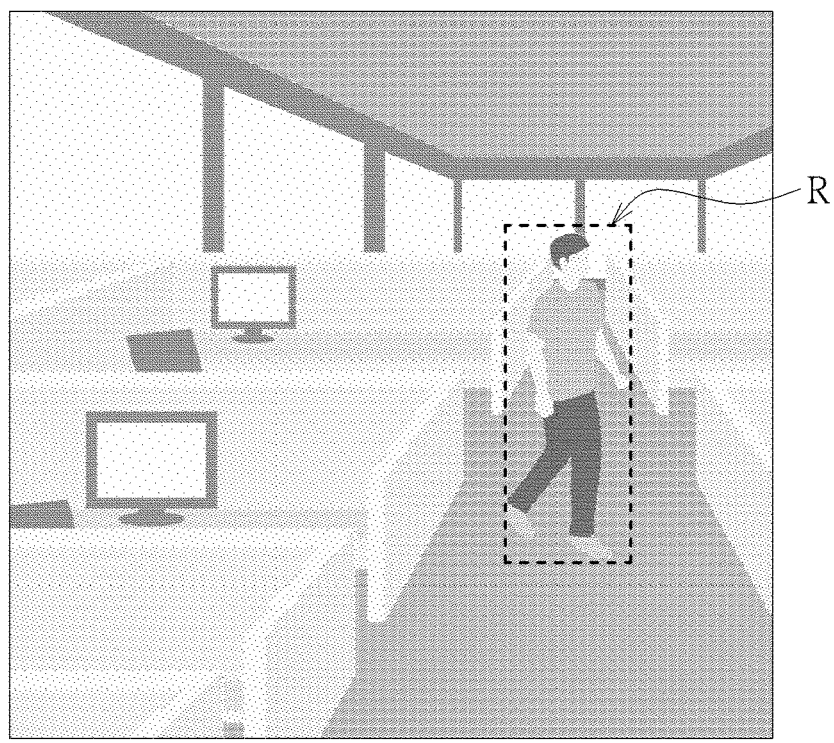
Figure 7:
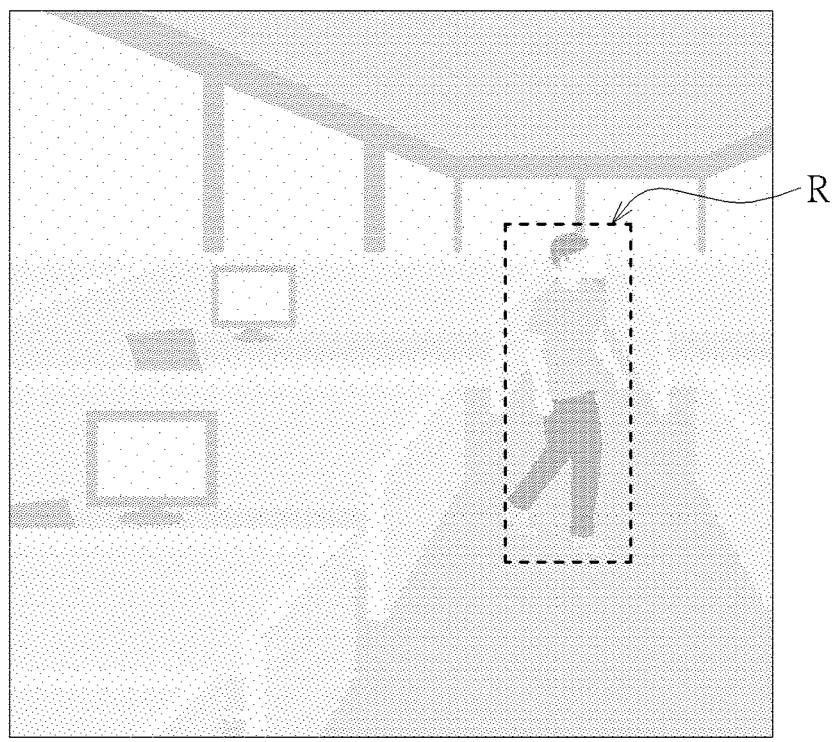
Figure 8:
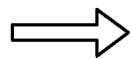
FIG. 8 and FIG. 9 are diagrams of analyzed results of the images captured by the camera apparatus according to the embodiment of the present invention.
Figure 9:
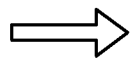

Please refer to FIG. 3 to FIG. 9. FIG. 3 is a flow chart of an object detection method according to the embodiment of the present invention. FIG. 4 to FIG. 7 are diagrams of images captured by the camera apparatus 10 in different conditions according to the embodiment of the present invention. FIG. 8 and FIG. 9 are diagrams of analyzed results of the images captured by the camera apparatus 10 according to the embodiment of the present invention. The object detection method illustrated in FIG. 3 can be suitable for the camera apparatus 10 shown in FIG. 1 and FIG. 2. First, step S100 can be executed to acquire a first exposure parameter and a second exposure parameter greater than the first exposure parameter. The first exposure parameter and the second exposure parameter can be predefined values of the camera apparatus 10, or can be variable values computed by the ambient light information of the optical detector 16 or the image feature of the specific image. Then, steps S102 and S104 can be executed to utilize the first exposure parameter and the second exposure parameter to respectively acquire a first reference image I1r and a second reference image I2r containing the specific surveillance area when the camera apparatus 10 is not in an object detection period, and further utilize the first exposure parameter and the second exposure parameter to respectively acquire a first detection image I1d and a second detection image I2d containing the specific surveillance area during the object detection period.

Then, step S106 can be optionally executed to set a region of interest R inside the captured image for covering the region where the target object Ot may be possibly appeared; for example, the region of interest R can correspond to the hallway in the office, and therefore the first reference image I1r, the second reference image I2r, the first detection image I1d and the second detection image I2d can have the same region of interest R. Step S108 can be executed to compute a first pixel value variation between the first reference image I1r and the first detection image I1d, and a second pixel value variation between the second reference image I2r and the second detection image I2d. In step S108, the object detection method of the present invention may compute the pixel value variation of all pixels inside the reference image and the detection image, or may compute the pixel value variation of some pixels inside the region of interest R of the reference image and the detection image. Final, step S110 can be executed to analyze the first pixel value variation and the second pixel value variation to determine whether the target object Ot is existed in the specific surveillance area.

As shown in FIG. 8 and FIG. 9, the region of interest R of the first reference image I1r can have a first reference pixel matrix NS_REF, and the region of interest R of the first detection image I1d can have a first detection pixel matrix NS_CMP; the region of interest R of the second reference image I2r can have a second reference pixel matrix LS_REF, and the region of interest R of the second detection image I2d can have a second detection pixel matrix LS_CMP. In the embodiment, step S108 of computing the first pixel value variation between the first reference image I1r and the first detection image I1d can acquire a first pixel matrix difference D_NS by subtracting the first reference pixel matrix NS_REF from the first detection pixel matrix NS_CMP, and step S108 of computing the second pixel value variation between the second reference image I2r and the second detection image I2d can acquire a second pixel matrix difference D_LS by subtracting the second reference pixel matrix LS_REF from the second detection pixel matrix LS_CMP. That is, a part of the first pixel matrix difference D_NS can have large pixel value variation (which means exceeding the specific threshold) and be marked as a first mark M1, and a part of the second pixel matrix difference D_LS can have the large pixel value variation (which means exceeding the specific threshold) and be marked as a second mark M2.

The camera apparatus 10 can analyze the first mark M1 to determine whether the target object Ot is existed in the surveillance area of the first reference image I1r and the first detection image I1d, and further can analyze the second mark M2 to determine whether the target object Ot is existed in the surveillance area of the second reference image I2r and the second detection image I2d. If a position and a dimension of the first mark M1 inside the first detection image I1d are the same as or similar to the position and the dimension of the second mark M2 inside the second detection image I2d, the camera apparatus 10 can be interpreted as catching the same target object Ot via the reference images and the detection images captured by different exposure parameters.

In step S110, the first pixel value variation and the second pixel value variation may be compared with the same variable threshold, or may be respectively compared with different variable thresholds. If the first pixel value variation (or the first mark M1) and the second pixel value variation (or the second mark M2) are greater than or equal to the variable threshold, the target object Ot is appeared in the surveillance area of the camera apparatus 10 and caught in the first detection image I1d captured by the first exposure parameter and the second detection image I2d captured by the second exposure parameter. If the first pixel value variation (or the first mark M1) and the second pixel value variation (or the second mark M2) are smaller than the variable threshold, there has no target object stayed in the surveillance area of the camera apparatus 10; or the target object cannot be caught in the first detection image I1d captured by the first exposure parameter and the second detection image I2d captured by the second exposure parameter, so that the object detection method may optionally utilize a third exposure parameter greater than the first exposure parameter and the second exposure parameter to capture a third reference image and a third detection image, for ensuring that the target object is not existed in the surveillance area of the camera apparatus 10 or cannot be caught by the second detection image I2d due to the low environmental illumination.

If the first pixel value variation (or the first mark M1) is smaller than the variable threshold and the second pixel value variation (or the second mark M2) is greater than or equal to the variable threshold, the target object Ot cannot be caught in the first reference image I1r and the first detection image I1d captured by the first exposure parameter due to the low environmental illumination, but can be clearly detected in the second reference image I2r and the second detection image I2d captured by the second exposure parameter, so that the object detection method can decide the target object Ot is existed in the surveillance area of the camera apparatus 10. If the first pixel value variation (or the first mark M1) is greater than or equal to the variable threshold and the second pixel value variation (or the second mark M2) is smaller than the variable threshold, the second reference image I2r and the second detection image I2d cannot catch the target object Ot due to high environmental illumination or other factors, and the object detection method of the present invention still can analyze the first reference image I1r and the first detection image I1d to determine the target object Ot is existed in the surveillance area of the camera apparatus 10. A value of the variable threshold can depend on optical parameters of the camera apparatus 10, and a detailed description is omitted herein for simplicity.

When the first pixel value variation and the second pixel value variation can be both used to determine existence of the target object Ot, and the target object Ot identified by the first pixel value variation conforms to the target object Ot identified by the second pixel value variation, it seems like the camera apparatus 10 can accurately determine the target object Ot is existed in the surveillance area only via analysis of the first reference image I1r and the first detection image I1d captured by the first exposure parameter; in the situation, the object detection method of the present invention may optionally turn off the multi-exposure function, to not capture the second reference image I2r and the second detection image I2d via the second exposure parameter, for economizing energy consumption, systematic computation and data storage.

Further, the object detection method may optionally divide the first pixel matrix difference D_NS of the first pixel value variation into a first region whereinside the target object Ot is located (which means somewhere inside the first mark M1) and a second region out of the target object Ot (which means somewhere outside the first mark M1), and compare a difference between the first region and the second region with a predefined gradient threshold. A value of the gradient threshold can depend on the environmental illumination around the camera apparatus 10, and the detailed description is omitted herein for simplicity. If the foresaid difference is smaller than or equal to the gradient threshold, the first mark M1 is difficult to identify the existence of the target object Ot, and the reference images and the detection images captured by the first exposure parameter and the second exposure parameter are used to execute the object detection method. If the foresaid difference is greater than the gradient threshold, the first mark M1 is sufficient to identify the existence of the target object Ot, which means the first reference image I1r and the first detection image I1d can be analyzed to clearly determine the existence of the object Ot; in the situation, the object detection method of the present invention may optionally turn off the multi-exposure function, to not capture the second reference image I2r and the second detection image I2d via the second exposure parameter.

After the multi-exposure function is turned off, the camera apparatus 10 and the object detection method can periodically actuate the optical detector 16 to acquire the ambient light information of the surveillance area, and immediately analyze the ambient light information to determine whether to turn on the multi-exposure function. For example, if the ambient light information is greater than a predefined intensity threshold, the camera apparatus 10 has preferred environmental illumination and the multi-exposure function can be kept in a turned off mode. If the ambient light information is lower than or equal to the predefined intensity threshold, the camera apparatus 10 may have the low environmental illumination, and the multi-exposure function can be switched into a turned on mode to ensure that the camera apparatus 10 can accurately determine whether the target object Ot is existed or passed in the surveillance area. The second exposure parameter of the multi-exposure function can be computed in accordance with the intensity of the ambient light information, or the systematic predefined value of the camera apparatus 10. A value of the intensity threshold can depend on the environmental illumination around the camera apparatus 10, and the detailed description is omitted herein for simplicity.

Further, after the multi-exposure function is turned off, the camera apparatus 10 and the object detection method can optionally analyze the image intensity of the first reference image I1r and/or the first detection image I1d, and determine whether to turn on the multi-exposure function in accordance with the image intensity. The image intensity may be an average intensity value or a maximum intensity value of all pixels in the image, or a computed intensity value of the average intensity value and the maximum intensity value. For example, if the image intensity of the first reference image I1r or the first detection image I1d is greater than the predefined intensity threshold, the camera apparatus 10 may have the preferred environmental illumination, and the multi-exposure function can be kept in the turned off mode. If the image intensity of the first reference image I1r or the first detection image I1d is smaller than or equal to the predefined intensity threshold, the camera apparatus 10 has the low environmental illumination, and the multi-exposure function can be switched into the turned on mode accordingly. The second exposure parameter of the multi-exposure function can be decided by the image intensity of the first reference image I1r or the first detection image I1d; for example, the average intensity value and the maximum intensity value of pixels within the first reference image I1r or the first detection image I1d can be computed for a start, and at least one of the average intensity value and the maximum intensity value can be transformed from the computed intensity value into the second exposure parameter via a predefined weighting. Computation of the computed intensity value and a weight value of the predefined weighting can depend on the systematic setting of the camera apparatus 10, and the detailed description is omitted herein for simplicity.

Besides, after the multi-exposure function is turned on, the camera apparatus 10 and the object detection method can optionally analyze the second pixel value variation between the second reference image I2r and the second detection image I2d to determine whether to adjust the second exposure parameter. The present invention can utilize the over-exposed image to detect the low-contrast target object Ot; if the second pixel value variation (such as the second pixel matrix difference D_LS shown in FIG. 9) is analyzed to indicate the over-exposed image does not have a reasonable over-exposed area, the object detection method of the present invention can increase or decrease the second exposure parameter in response to a degree of the unreasonable over-exposed area, so as to keep the preferred identification accuracy of the camera apparatus 10.

Figure 10:
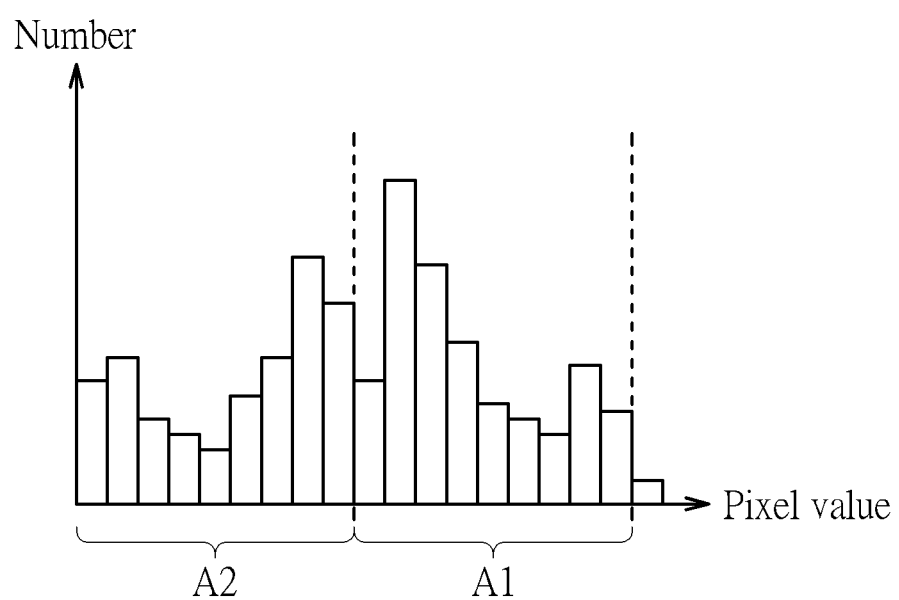
FIG. 10 is a diagram of an intensity distribution histogram of the first reference image according to the embodiment of the present invention.

Please refer to FIG. 10. FIG. 10 is a diagram of an intensity distribution histogram of the first reference image I1r according to the embodiment of the present invention. The foresaid embodiment discloses the second exposure parameter can be acquired by the ambient light information or the computed intensity value of the first reference image I1r, and the present invention still can provide other possible embodiment. In some possible embodiment, the camera apparatus 10 and the object detection method can acquire the intensity distribution histogram of the first reference image I1r and/or the first detection image I1d; as an example of the intensity distribution histogram of the first reference image I1r shown in FIG. 10, the object detection method can divide the intensity distribution histogram into a high intensity distribution region A1 and a low intensity distribution region A2, and estimate or compute an over-exposed value via a ratio of the high intensity distribution region A1 to the low intensity distribution region A2, and the over-exposed value can be represented as or transformed into the second exposure parameter. The over-exposed degree of the over-exposed images can be analyzed to acquire the preferred second exposure parameter, and any manners of computing the second exposure parameter for capturing the over-exposed second reference image I2r and the over-exposed second detection image I2d can belong to a scope of the present invention.

In the present invention, the object detection method may analyze the intensity distribution histogram of the second reference image I2r and/or the second detection image I2d to compute and determine whether to adjust the second exposure parameter, which may be similar to the above-mentioned embodiment of utilizing the intensity distribution histogram of the first reference image I1r and/or the first detection image I1d to acquire the first exposure parameter, and the detailed description is omitted herein for simplicity.

In conclusion, the camera apparatus and the object detection method of the present invention can both utilize the short exposure image (such as the first reference image and the first detection image captured by the first exposure parameter) and the long exposure image (such as the second reference image and the second detection image captured by the second exposure parameter) to determine the existence of the target object. Analysis of the short exposure image may be insufficient to accurately detect the low-contrast target object under the low environmental illumination, and analysis of the long exposure image may be difficult to identify a bright feature of the target object which results in a supersaturated part of the image; therefore, the present invention can synchronously analyze the short exposure image and the long exposure image to execute the object detection method, and further provide the automatic turning-on/turning-off multi-exposure function, so that the camera apparatus can have advantages of the high identification accuracy and the preferred energy economy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object detection method of effectively increasing identification accuracy, the object detection method comprising:
    acquiring a first reference image and a second reference image containing a specific surveillance area respectively via a first exposure parameter and a second exposure parameter greater than the first exposure parameter;
    utilizing the first exposure parameter and the second exposure parameter to respectively capture a first detection image and a second detection image during a motion detection period;
    computing a first pixel value variation between the first reference image and the first detection image, and a second pixel value variation between the second reference image and the second detection image; and
    analyzing the first pixel value variation and the second pixel value variation to determine whether a target object is moved within the specific surveillance area.

2. The object detection method of claim 1, further comprising:
    setting a region of interest inside the first reference image and the first detection image for computing the first pixel value variation of pixels within the region of interest.

3. The object detection method of claim 1, further comprising:
    deciding whether to stop capturing another reference image and another detection image by the second exposure parameter when the target object determined by the first pixel value variation conforms to the target object determined by the second pixel value variation.

4. The object detection method of claim 1, further comprising:
    dividing the first pixel value variation into a first region whereinside the target object is located and a second region out of the first region;
    comparing a difference between the first region and the second region with a gradient threshold; and
    deciding whether to stop capturing another reference image and another detection image by the second exposure parameter when the difference exceeds the gradient threshold.

5. The object detection method of claim 1, further comprising:
    actuating an optical detector to acquire ambient light information; and
    analyzing the ambient light information to decide whether to capture the second reference image and the second detection image by the second exposure parameter.

6. The object detection method of claim 5, further comprising:
    acquiring the second exposure parameter via analysis of an intensity of the ambient light information.

7. The object detection method of claim 1, further comprising:
    comparing a computed intensity value of the first reference image with an intensity threshold; and
    utilizing the second exposure parameter to capture the second reference image and the second detection image when the computed intensity value is smaller than the intensity threshold.

8. The object detection method of claim 7, further comprising:
    acquiring at least one computed value of an average intensity value and a maximum intensity value of the first reference image; and
    transforming the computed value into the second exposure parameter via a predefined weighting.

9. The object detection method of claim 7, further comprising:
    acquiring an intensity distribution histogram of the first reference image;
    dividing the intensity distribution histogram at least into a high intensity distribution region and a low intensity distribution region; and
    utilizing a ratio of the high intensity distribution region to the low intensity distribution region to compute the second exposure parameter.

10. The object detection method of claim 1, further comprising:
    analyzing the second pixel value variation to decide whether to adjust the second exposure parameter.

11. A camera apparatus of effectively increasing identification accuracy, the camera apparatus comprising:
    an image receiver adapted to acquire a first reference image and a second reference image containing a specific surveillance area respectively via a first exposure parameter and a second exposure parameter greater than the first exposure parameter, and utilize the first exposure parameter and the second exposure parameter to respectively capture a first detection image and a second detection image during an object detection period; and an operation processor electrically connected to the image receiver, and adapted to compute a first pixel value variation between the first reference image and the first detection image and a second pixel value variation between the second reference image and the second detection image, and analyze the first pixel value variation and the second pixel value variation to determine whether a target object is within the specific surveillance area;

wherein the operation processor is further adapted to decide whether to stop capturing another reference image and another detection image by the second exposure parameter when the target object determined by the first pixel value variation conforms to the target object determined by the second pixel value variation.

12. The camera apparatus of claim 11, wherein the operation processor is further adapted to set a region of interest inside the first reference image and the first detection image for computing the first pixel value variation of pixels within the region of interest.

13. The camera apparatus of claim 11, wherein the operation processor is further adapted to divide the first pixel value variation into a first region whereinside the target object is located and a second region out of the first region, and compare a difference between the first region and the second region with a gradient threshold, and decide whether to stop capturing another reference image and another detection image by the second exposure parameter when the difference exceeds the gradient threshold.

14. The camera apparatus of claim 11, wherein the camera apparatus further comprises an optical detector electrically connected to the operation processor and adapted to acquire ambient light information, and the operation processor is further adapted to analyze the ambient light information to decide whether to capture the second reference image and the second detection image by the second exposure parameter.

15. The camera apparatus of claim 14, wherein the operation processor is further adapted to acquire the second exposure parameter via analysis of an intensity of the ambient light information.

16. The camera apparatus of claim 11, wherein the operation processor is further adapted to compare a computed intensity value of the first reference image with an intensity threshold, and utilize the second exposure parameter to capture the second reference image and the second detection image when the computed intensity value is smaller than the intensity threshold.

17. The camera apparatus of claim 16, wherein the operation processor is further adapted to acquire at least one computed value of an average intensity value and a maximum intensity value of the first reference image, and transform the computed value into the second exposure parameter via a predefined weighting.

18. The camera apparatus of claim 16, wherein the operation processor is further adapted to acquire an intensity distribution histogram of the first reference image, divide the intensity distribution histogram at least into a high intensity distribution region and a low intensity distribution region, and utilize a ratio of the high intensity distribution region to the low intensity distribution region to compute the second exposure parameter.

19. The camera apparatus of claim 11, wherein the operation processor is further adapted to analyze the second pixel value variation to decide whether to adjust the second exposure parameter.

* * * * *